US008555080B2

(12) United States Patent
More et al.

(10) Patent No.: US 8,555,080 B2
(45) Date of Patent: Oct. 8, 2013

(54) METHODS AND SYSTEMS FOR PROTECT AGENTS USING DISTRIBUTED LIGHTWEIGHT FINGERPRINTS

(75) Inventors: Scott More, Tokyo (JP); Ilya Beyer, San Mateo, CA (US); Daniel Christopher John Sweeting, Hornchurch (GB)

(73) Assignee: Workshare Technology, Inc., San Francisco, CA (US)

( * ) Notice: Subject to any disclaimer, the term of this patent is extended or adjusted under 35 U.S.C. 154(b) by 1211 days.

(21) Appl. No.: 12/209,082

(22) Filed: Sep. 11, 2008

(65) Prior Publication Data

US 2010/0064347 A1  Mar. 11, 2010

(51) Int. Cl.
*G06F 21/00* (2013.01)
(52) U.S. Cl.
USPC .............................. 713/186; 726/30
(58) Field of Classification Search
USPC .......................... 713/186; 726/30
See application file for complete search history.

(56) References Cited

U.S. PATENT DOCUMENTS

| 4,479,195 | A | 10/1984 | Herr et al. |
| 4,949,300 | A | 8/1990 | Christenson et al. |
| 5,008,853 | A | 4/1991 | Bly et al. |
| 5,072,412 | A | 12/1991 | Henderson, Jr. et al. |
| 5,220,657 | A | 6/1993 | Bly et al. |
| 5,245,553 | A | 9/1993 | Tanenbaum |
| 5,247,615 | A | 9/1993 | Mori et al. |
| 5,293,619 | A | 3/1994 | Dean |
| 5,379,374 | A | 1/1995 | Ishizaki et al. |
| 5,446,842 | A | 8/1995 | Schaeffer et al. |
| 5,608,872 | A | 3/1997 | Schwartz et al. |
| 5,617,539 | A | 4/1997 | Ludwig et al. |
| 5,634,062 | A | 5/1997 | Shimizu et al. |
| 5,671,428 | A | 9/1997 | Muranaga et al. |
| 5,699,427 | A | 12/1997 | Chow et al. |
| RE35,861 | E | 7/1998 | Queen |

(Continued)

FOREIGN PATENT DOCUMENTS

| JP | 10177650 A | 6/1998 |
| JP | 2004265267 A | 9/2004 |

(Continued)

OTHER PUBLICATIONS

International Search Report of PCT Application No. PCT/US2009/056651, Dated Apr. 21, 2010, pp. 1-3.

(Continued)

*Primary Examiner* — Carl Colin
*Assistant Examiner* — S. Ali Zaidi
(74) *Attorney, Agent, or Firm* — Perkins Coie LLP

(57) ABSTRACT

The present invention provides methods and systems to protect an organization's secure information from unauthorized disclosure. The present system uses protect agents installed across various egress points (e.g., email server, user's computer, etc.) to monitor information disclosed by a user. The present system also provides the use of lightweight fingerprint databases (LFD) to maintain a database of fingerprints associated with the organization's secure data. In one embodiment, the LFD is stored locally at the site of each protect agent such that the organization's secure information can be protected even when a protect agent is disconnected from the network. Methods and systems to compress fingerprints to achieve the lightweight fingerprint databases are also provided. In one embodiment, a combined approach, utilizing both the local lightweight fingerprint database and a remote fingerprint server comprising registered fingerprints is used to achieve overall protection of the organization's secure information.

38 Claims, 4 Drawing Sheets

(56) References Cited

U.S. PATENT DOCUMENTS

| | | |
|---|---|---|
| 5,787,175 A | 7/1998 | Carter |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,890,177 A | 3/1999 | Moody et al. |
| 5,898,836 A | 4/1999 | Freivald et al. |
| 6,003,060 A | 12/1999 | Aznar et al. |
| 6,012,087 A | 1/2000 | Freivald et al. |
| 6,049,804 A | 4/2000 | Burgess et al. |
| 6,067,551 A | 5/2000 | Brown et al. |
| 6,088,702 A | 7/2000 | Plantz et al. |
| 6,145,084 A | 11/2000 | Zuili et al. |
| 6,189,019 B1 | 2/2001 | Blumer et al. |
| 6,212,534 B1 | 4/2001 | Lo et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,321,265 B1 | 11/2001 | Najork et al. |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,513,050 B1 | 1/2003 | Williams et al. |
| 6,547,829 B1 | 4/2003 | Meyerzon et al. |
| 6,560,620 B1 | 5/2003 | Ching |
| 6,584,466 B1 | 6/2003 | Serbinis et al. |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,738,762 B1 | 5/2004 | Chen et al. |
| 7,035,427 B2 | 4/2006 | Rhoads |
| 7,107,518 B2 | 9/2006 | Ramaley et al. |
| 7,152,019 B2 * | 12/2006 | Tarantola et al. .............. 702/186 |
| 7,212,955 B2 * | 5/2007 | Kirshenbaum et al. ........ 702/187 |
| 7,233,686 B2 | 6/2007 | Hamid |
| 7,240,207 B2 | 7/2007 | Weare |
| 7,299,504 B1 * | 11/2007 | Tiller et al. ...................... 726/30 |
| 7,356,704 B2 * | 4/2008 | Rinkevich et al. ............. 713/183 |
| 7,434,164 B2 | 10/2008 | Salesin et al. |
| 7,454,778 B2 | 11/2008 | Pearson et al. |
| 7,496,841 B2 | 2/2009 | Hadfield et al. |
| 7,564,997 B2 | 7/2009 | Hamid |
| 7,624,447 B1 | 11/2009 | Horowitz et al. |
| 7,627,613 B1 | 12/2009 | Dulitz et al. |
| 7,673,324 B2 | 3/2010 | Tirosh et al. |
| 7,680,785 B2 | 3/2010 | Najork |
| 7,694,336 B2 * | 4/2010 | Rinkevich et al. .............. 726/21 |
| 7,720,256 B2 | 5/2010 | Desprez et al. |
| 7,730,175 B1 * | 6/2010 | Roesch et al. ................. 709/224 |
| 7,844,116 B2 | 11/2010 | Monga |
| 7,857,201 B2 | 12/2010 | Silverbrook et al. |
| 7,877,790 B2 * | 1/2011 | Vishik et al. ..................... 726/5 |
| 7,890,752 B2 * | 2/2011 | Bardsley et al. ............... 713/160 |
| 8,005,277 B2 | 8/2011 | Tulyakov et al. |
| 8,042,112 B1 | 10/2011 | Zhu et al. |
| 8,181,036 B1 | 5/2012 | Nachenberg |
| 8,286,171 B2 | 10/2012 | More et al. |
| 8,406,456 B2 | 3/2013 | More |
| 2002/0010682 A1 | 1/2002 | Johnson |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 * | 5/2002 | Hoyos et al. ................ 235/382.5 |
| 2002/0065827 A1 | 5/2002 | Christie et al. |
| 2002/0065848 A1 | 5/2002 | Walker et al. |
| 2002/0073188 A1 | 6/2002 | Rawson |
| 2002/0087515 A1 | 7/2002 | Swannack et al. |
| 2002/0099602 A1 | 7/2002 | Moskowitz et al. |
| 2002/0129062 A1 | 9/2002 | Luparello |
| 2002/0136222 A1 * | 9/2002 | Robohm .................. 370/395.31 |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0037010 A1 | 2/2003 | Schmelzer |
| 2003/0061260 A1 | 3/2003 | Rajkumar |
| 2003/0131005 A1 | 7/2003 | Berry |
| 2003/0158839 A1 | 8/2003 | Faybishenko et al. |
| 2003/0223624 A1 | 12/2003 | Hamid |
| 2004/0002049 A1 | 1/2004 | Beavers et al. |
| 2005/0138540 A1 | 6/2005 | Baltus et al. |
| 2005/0251748 A1 | 11/2005 | Gusmorino et al. |
| 2006/0005247 A1 | 1/2006 | Zhang et al. |
| 2006/0021031 A1 * | 1/2006 | Leahy et al. ..................... 726/22 |
| 2006/0050937 A1 | 3/2006 | Hamid |
| 2006/0059196 A1 * | 3/2006 | Sato et al. .................. 707/104.1 |
| 2006/0064717 A1 * | 3/2006 | Shibata et al. ................... 725/37 |
| 2006/0067578 A1 | 3/2006 | Fuse |
| 2006/0098850 A1 | 5/2006 | Hamid |
| 2006/0112120 A1 | 5/2006 | Rohall |
| 2006/0171588 A1 | 8/2006 | Chellapilla et al. |
| 2006/0218004 A1 | 9/2006 | Dworkin et al. |
| 2006/0224589 A1 | 10/2006 | Rowney et al. |
| 2006/0236246 A1 | 10/2006 | Bono et al. |
| 2006/0271947 A1 | 11/2006 | Lienhart et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0025265 A1 | 2/2007 | Porras et al. |
| 2007/0101154 A1 * | 5/2007 | Bardsley et al. .............. 713/186 |
| 2007/0101413 A1 * | 5/2007 | Vishik et al. ...................... 726/5 |
| 2007/0192728 A1 | 8/2007 | Finley et al. |
| 2007/0253608 A1 | 11/2007 | Tulyakov et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2008/0033913 A1 | 2/2008 | Winburn |
| 2008/0080515 A1 | 4/2008 | Tombroff et al. |
| 2008/0082529 A1 | 4/2008 | Mantena et al. |
| 2008/0219495 A1 | 9/2008 | Hulten et al. |
| 2008/0320316 A1 | 12/2008 | Waldspurger et al. |
| 2009/0034804 A1 | 2/2009 | Cho et al. |
| 2009/0064326 A1 * | 3/2009 | Goldstein ....................... 726/22 |
| 2009/0129002 A1 * | 5/2009 | Wu et al. ..................... 361/679.4 |
| 2009/0241187 A1 * | 9/2009 | Troyansky ....................... 726/22 |
| 2010/0017850 A1 | 1/2010 | More et al. |
| 2010/0064372 A1 * | 3/2010 | More et al. ....................... 726/26 |
| 2010/0070448 A1 | 3/2010 | Omoigui |
| 2010/0114985 A1 | 5/2010 | Chaudhary et al. |
| 2010/0114991 A1 | 5/2010 | Chaudhary et al. |
| 2010/0299727 A1 * | 11/2010 | More et al. ....................... 726/5 |

FOREIGN PATENT DOCUMENTS

| | | |
|---|---|---|
| JP | 2007299364 A | 11/2007 |
| KR | 1020010078840 | 8/2001 |
| KR | 20040047413 A | 6/2004 |
| KR | 1020060048686 | 5/2006 |
| KR | 200070049518 A | 5/2007 |
| KR | 1020080029602 | 4/2008 |
| WO | WO-0060504 A1 | 10/2000 |

OTHER PUBLICATIONS

Written Opinion PCT Application No. PCT/US2009/056651, Dated Apr. 21, 2010, pp. 1-5.

Weiss et al., Lightweight document matching for help-desk applications, In: Intelligent Systems and their Applications, IEEE, Vo. 15, Issue:2, pp. 57-61, ISSN 1094-7167, 2000.

International Search Report of PCT Application No. PCT/US2009/065019 dated Jun. 4, 2010, pp. 1-6.

Written Opinion PCT Application No. PCT/US2009/065019 dated Jun. 4, 2010, pp. 1-5.

International Search Report of PCT Application No. PCT/US2009/064919 dated Jul. 1, 2010, pp. 1-3.

Written Opinion PCT Application No. PCT/US2009/064919 dated Jul. 1, 2010, pp. 1-4.
International Search Report of PCT Application No. PCT/US2009/056668 dated Apr. 16, 2010, pp. 1-9.
Written Opinion PCT Application No. PCT/US2009/056668 dated Apr. 16, 2010 pp. 1-4.
PC Magazine "Pure Intranets: Real-Time Internet Collaboration", http://www.zdnet.com/pcmag/featuresgroupware/gpwst.htm, Aug. 30, 2001, 2 pages.
Wells et al., "Groupware & Collaboration Support", www.objs.com/survey/groupwar.htm, Aug. 30, 2001, 10 pages.
Tsai, et al., "A Document Workspace for Collaboration and Annotation based on XML Technology", IEEE, 2000, pp. 165-172.
Roussev, et al., "Integrating XML and Object-based Programming for Distributed Collaboration", IEEE, 2000, pp. 254-259.
XP-002257904, "Workshare Debuts Synergy", 2003, 3 pages.
International Search Report of PCT Application No. PCT/IB2002/005821, Jan. 30, 2004, 6 pages.
International Search Report of PCT Application No. PCT/US2009/051313, Mar. 3, 2010, 3 pages.
Written Opinion of PCT Application No. PCT/US2009/051313, Mar. 3, 2010, 4 pages.
Co-pending U.S. Appl. No. 10/136,733, filed Apr. 30, 2002.
Co-pending U.S. Appl. No. 10/023,010, filed Dec. 17, 2001.
Co-pending U.S. Appl. No. 12/209,096, filed Sep. 11, 2008.
Non-Final Office Action Mailed Mar. 20, 2006 in Co-pending U.S. Appl. No. 10/136,733 filed Apr. 30, 2002.
Notice of Allowance Mailed Oct. 24, 2008 in Co-pending U.S. Appl. No. 10/023,010 filed Dec. 17, 2001.
Non-Final Office Action Mailed May 7, 2008 in Co-pending U.S. Appl. No. 10/023,010 filed Dec. 17, 2001.
Final Office Action Mailed Apr. 17, 2007 for U.S. Appl. No. 10/023,010 filed Dec. 17, 2001, Issued Patent No. 7,496,841.
Final Office Action Mailed Aug. 12, 2011 for U.S. Appl. No. 12/209/096 filed Sep. 11, 2008.
International Search Report of PCT Application No. PCT/US2010/043345, Apr. 28, 2011, 3 pages.
Non-Final Office Action Mailed Jan. 9, 2012 in Co-Pending U.S. Appl. No. 12/177,043 filed Jul. 21, 2008.
Non-Final Office Action Mailed Mar. 11, 2011, in Co-pending U.S. Appl. No. 12/209,096 filed Sep. 11, 2008.
Non-Final Office Action Mailed Mar. 16, 2006 for U.S. Appl. No. 10/023,010 filed Dec. 17, 2001, Issued Patent No. 7,496,841.
Non-Final Office Action Mailed Sep. 19, 2011 for U.S. Appl. No. 12/177,043 filed Jul. 21, 2008.
Restriction Requirement Mailed Feb. 14, 2005 for U.S. Appl. No. 10/023,010 filed Dec. 17, 2001, Issued Patent No. 7,496,841.
Restriction Requirement Mailed Feb. 5, 2008 for U.S. Appl. No. 10/023,010 filed Dec. 17, 2001, Issued Patent No. 7,496,841.
Restriction Requirement Mailed Jun. 30, 2006 for U.S. Appl. No. 10/136,733 filed Apr. 30, 2002.
Monga, et al., "Perceptual Image Hashing Via Feature Points: Performance Evaluation and Tradeoffs," IEEE Tranactions on Image Processing, vol. 15, No. 11, Nov. 2006.
Monga, "Robust Perceptual Image Hashing Using Feature Points," http://bluecoat-02/?cfru=aHR0cDovL3NpZ25hbC51Y2UudXRleGFzLmVkdS9+dmlzaGFsL2hhc2gtZmVyZEkucHM=, 2003.

Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Xuefeng Liang; et al., "Fingerprint Matching Using Minutia Polygons," Pattern Recognition, 2006, ICPR 2006, 18th International Conference on, vol. 1, No., pp. 1046-1049.
Sujoy Roy, et al., "Robust Hash for Detecting and Localizing Image Tampering," Image Processing, 2007, ICIP 2007, IEEE International Conference on, vol. 6, No., pp. VI-117-VI-120, Sep. 16, 2007-Oct. 19, 2007.
Yung, et al., "Generating Robust Digital Signature for Image/Video Authentication," Multimedia and Security Workshop at ACM Multimedia '98, Bristol, U.K., Sep. 1998.
Non-Final Office Action Mailed Aug. 1, 2012 in Co-Pending U.S. Appl. No. 12/621,429 filed Nov. 18, 2009.
Notice of Allowance Mailed Aug. 19, 2012 in Co-Pending U.S. Appl. No. 12/177,043 filed Jul. 21, 2008.
Notice of Allowance Mailed Jun. 26, 2012 in Co-Pending U.S. Appl. No. 12/275,185, filed Nov. 20, 2008.
Final Office Action Mailed Apr. 16, 2012 in Co-Pending U.S. Appl. No. 12/177,043 filed Jul. 21, 2008.
Non-Final Office Action Mailed Apr. 27, 2012 in Co-Pending U.S. Appl. No. 12/275,185, filed Nov. 20, 2008.
Co-pending U.S. Appl. No. 12/621,429, filed Nov. 18, 2009.
Co-pending U.S. Appl. No. 12/177,043, filed Jul. 21, 2008.
Co-pending U.S. Appl. No. 12/275,185, filed Nov. 20, 2008.
Co-pending U.S. Appl. No. 13/620,364, filed Sep. 14, 2012.
Co-Pending U.S. Appl. No. 13/659,793, filed Oct. 24, 2012.
Co-Pending U.S. Appl. No. 13/659,817, filed Oct. 24, 2012.
Co-pending U.S. Appl. No. 12/844,818, filed Jul. 27, 2010.
Written Opinion PCT Application No. PCT/US2010/043345 dated Apr. 28, 2011, 4 pages.
Monga, V. et al., Perceptual image hashing via feature points: performance evaluation and tradeoffs IEEE Transactions on Image Processing, 15 (11) (2006), pp. 3453-3466.
Tulyakov et al, Symmetric Hash Functions for Fingerprint Minutiae, ICAPR 2005, LNCS 3687, pp. 30-38, 2005.
Notice of Allowance Mailed Oct. 2, 2012, in Co-Pending U.S. Appl. No. 12/275,185 of More, S., filed Nov. 20, 2008.
Non-Final Office Action Mailed Mar. 18, 2013 in Co-Pending U.S. Appl. No. 13/659,793 of More, S., filed Oct. 24, 2012.
Non-Final Office Action Mailed Apr. 26, 2013 in Co-Pending U.S. Appl. No. 13/659,817 of More, S., filed Oct. 24, 2012.
Final Office Action Mailed Feb. 1, 2013 in Co-Pending U.S. Appl. No. 12/621,429 of More, S., filed Nov. 18, 2009.
Advisory Action mailed Apr. 12, 2013, in Co-Pending U.S. Appl. No. 12/621,429 of More, S., filed Nov. 18, 2009.
Non-Final Office Action Mailed Sep. 19, 2012 in Co-Pending U.S. Appl. No. 12/844,818 of Glover, R., filed Jul. 27, 2010.
Final Office Action Mailed Jan. 18, 2013 in Co-Pending U.S. Appl. No. 12/844,818 of Glover, R., filed Jul. 27, 2010.
Notice of Allowance Mailed Mar. 13, 2013 in Co-Pending U.S. Appl. No. 12/844,818 of Glover, R., filed Jul. 27, 2010.

* cited by examiner

METHODS AND SYSTEMS FOR PROTECT AGENTS USING DISTRIBUTED LIGHTWEIGHT FINGERPRINTS

CROSS-REFERENCE TO RELATED APPLICATIONS

This application is related to U.S. application Ser. No. 12/177,043 filed Jul. 21, 2008, which is incorporated by reference as if fully set forth herein. This application is also related to applicants' co-pending application filed Sep. 11, 2008 entitled "Methods And Systems To Implement Fingerprint Lookups Across Remote Agents," Ser. No. 12/209,096.

FIELD OF INVENTION

The present invention relates to information security and more specifically it relates to systems and methods for detecting and preventing unauthorized disclosure of secure information. Furthermore, the present invention pertains to implementing fingerprint lookups across protect agents using locally stored lightweight fingerprints.

BACKGROUND OF THE INVENTION

With the rapid increase and advances in digital documentation services and document management systems, organizations are increasingly storing important, confidential, and secure information in the form of digital documents. Unauthorized dissemination of this information, either by accident or by wanton means, presents serious security risks to these organizations. Therefore, it is imperative for the organizations to protect such secure information and detect and react to any secure information (or derivatives thereof) from being disclosed beyond the perimeters of the organization.

Additionally, the organizations face the challenge of categorizing and maintaining the large corpus of digital information across potentially thousands of data stores, content management systems, end-user desktops, etc. One solution to this challenge is to generate fingerprints from all of the digital information that the organization seeks to protect. These fingerprints tersely and securely represent the organization's secure data, and can be maintained in a database for later verification against the information that a user desires to disclose. When the user wishes to disclose any information outside of the organization, fingerprints are generated for the user's information, and these fingerprints are compared against the fingerprints stored in the fingerprint database. If the fingerprints of the user's information matches with fingerprints contained in the fingerprint server, suitable security actions are performed.

However, the user has at his disposal myriad options to disclose the information outside of the organization's protected environment. For example, the user could copy the digital information from his computer to a removable storage medium (e.g., a floppy drive, a USB storage device, etc.), or the user could email the information from his computer through the organization's email server, or the user could print out the information by sending a print request through the organization's print server, etc. Therefore, it is imperative to monitor the user's activity through each of these egress points.

In order to effectively protect the organization's secure information, the information that is transmitted through any of the organization's egress points needs to be converted to fingerprints and compared against the fingerprints contained in the organization's fingerprint database. One way of achieving this would be by replicating and maintaining a plurality of fingerprint databases at the locations containing egress points (e.g., at the print server, at the email server, at the user's desktop computer, etc.). This can be achieved by means of database replication, agent polling, diff sync pushes from a central fingerprint server, etc. Another way of doing this would be by maintaining a remote server containing the fingerprint database and querying this remote server utilizing the network every time a user's input information needs to be verified.

However, both these fingerprinting solutions suffer several disadvantages. In the case of maintaining local fingerprint databases at every egress point, the cost and inefficiency of maintaining large-memory databases becomes prohibitively large. This is especially true in organizations that maintain hundreds (or thousands) of systems that function as egress points. Here, with the increase in the number of egress points, the number of individual fingerprint databases that need to be created, maintained, and refreshed periodically becomes excessively large. In addition, the fingerprints in the fingerprint database invariably contain additional metadata (e.g., to indicate the location of the fingerprint within a document, to indicate the origin information of the document, etc.), further increasing the size of the individual fingerprint databases, thus further exacerbating the cost and difficulties associated with maintaining a plethora of individual fingerprint databases.

On the other hand, the case of maintaining one or more remote fingerprint servers serving protect agents by communicating over the network presents a different set of problems. One problem is the offline scenario when a user is not connected to the network. In this case, the egress point cannot be monitored because fingerprint lookups cannot be done without the network. Therefore, the user is either prohibited from accessing the data, or the data is susceptible to unauthorized disclosure. Other problems with this method includes scalability and user experience. Specifically, making a remote request to the fingerprint servers will inevitably introduce latency on the egress point being protected. Also, as the number of protect agents increase, an increasing number of fingerprint servers will be needed to handle the increasing load, thus further affecting the latency and increasing the cost of performing fingerprint lookups.

Other solutions exist in the prior art to protect digital information in such porous environments. These solutions include encrypting the files, or applying digital rights management or watermarks directly to the files. These solutions do not typically employ the method of fingerprint lookups, and therefore do not require fingerprint databases to be maintained. However, they present other disadvantages. For example, the digital information itself needs to be converted, and unprotected versions of the information needs to be identified and managed (or destroyed) to ensure the security of the information. Additionally, the presence of the watermarking or the digital rights management information does not preclude the information from being disclosed outside of the organization. In most cases, the watermarks only serve as a security awareness or deterrent feature and do not actually prevent the information from being disclosed.

SUMMARY OF THE INVENTION

Methods and systems to provide efficient means to monitor and protect an organization's secure information using locally stored lightweight fingerprint databases is provided. In one embodiment, the present invention provides methods and systems to implement a protect agent across various egress points of an organization's computing environment. Examples of egress points include a printer or a removable storage device (e.g., a USB flash memory drive, CD drive, etc.) connected to a user's desktop computer through which the user could potentially transmit secure information outside of the organization's protected environment. The protect agents monitor activity across all egress points, and receive any information that a user intends to disclose through the egress points.

In one embodiment, lightweight fingerprint databases are locally stored at the site of each protect agent. To create a lightweight fingerprint database, a database of registered fingerprints is first created by generating fingerprints for the secure information that an organization intends to protect. The database of registered fingerprints is then compressed by generating raw fingerprints from the registered fingerprints (by stripping out the metadata information from the registered fingerprints) and/or storing the registered fingerprints in a data structure that supports membership queries while introducing a small probability of false positives (e.g., Bloom filters). The compressed database of fingerprints forms the lightweight fingerprint database.

Methods and systems to enable updating and synchronizing the lightweight fingerprint databases are provided. In one embodiment, the lightweight fingerprint databases are kept up-to-date by receiving updates from a remote fingerprint server. The fingerprint server sends the updates utilizing the network, where the network could either be the local network or the public internet or a combination of the two.

Methods and systems to use a combined approach of fingerprint lookups is also provided. In one embodiment, the protect agents communicate with the local lightweight fingerprint database when disconnected from the network. When connected to the network, the protect agents directly communicate with remote fingerprint servers (that have a database of registered fingerprints) utilizing the network.

In another embodiment of the combined approach, the protect agents preliminarily communicate with the local lightweight fingerprint database. The protect agents compare client fingerprints associated with the information that a user desires to transmit outside of the organization with the lightweight fingerprints in the local lightweight fingerprint database. If the comparison yields any positives, and if the protect agent is connected to the network, it queries the fingerprint server (having a database of registered fingerprints) for additional information associated with the positives. Examples of the additional information include metadata associated with the lightweight fingerprints or the elimination of any false positives (when approximate member query methods such as Bloom filters are used).

The methods and systems presented here overcome the problems prevalent in prior art. For example, the egress points are monitored and protected even when the system is not connected to the network. At the same time, by using lightweight compression techniques, the storage size of the local lightweight fingerprint databases are considerably reduced, making it more manageable and useable at all protect agent locations. Additionally, when the network is utilized for communication with the fingerprint servers, the number of requests made is considerably lower (because not all fingerprint lookups are routed to the remote fingerprint serves), resulting in improved latency across protect agents.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Figure 1:
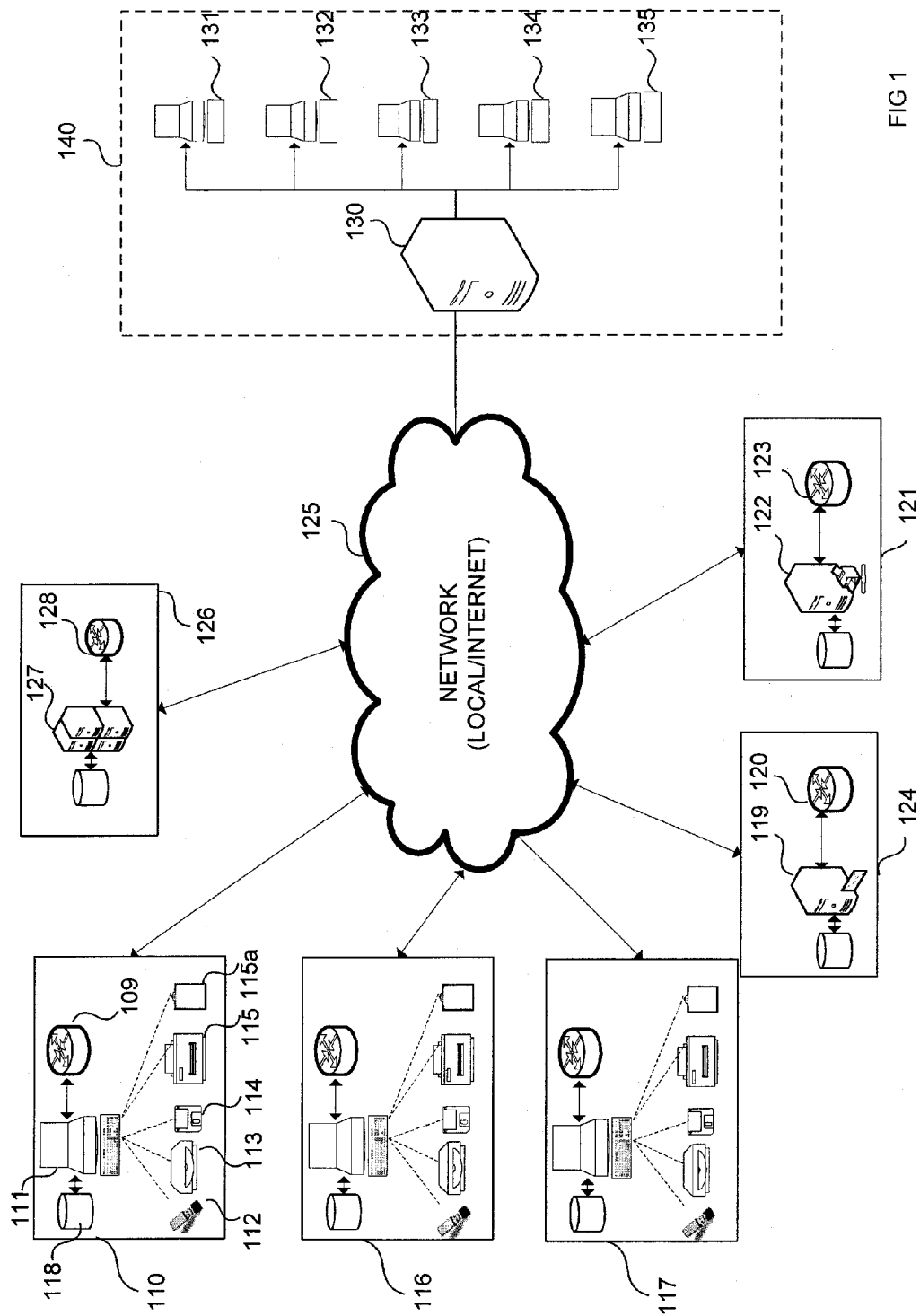
FIG. 1 illustrates an overall embodiment of a fingerprint lookup system utilizing lightweight fingerprint databases.

FIG. 1 shows one example of an overall setup to implement protect agent lookups using a lightweight fingerprint database. One of the means by which a user can disclose digital information outside of the organization's perimeter is by disclosing the information through his computer system 110. Examples of such a computer system include a desktop computer, a laptop, a PDA or any such device that allows a user to access the organization's information. In one embodiment, the computing system 110 is connected to a network 125. Here, the computing system 110 comprises the desktop/laptop computer 111 through which the user accesses the organization's secure information. The user would be able to transfer information outside of the organization by transferring the information to any medium connected to the computer.

Such points at which information can be transferred outside of the organization's protected environment are called egress points. Examples of transferring data at egress points include copying the information from the computer to a CD disk 112 or any other optical storage medium, copying the information to a floppy drive 113 or any other tape medium, copying the information to a USB key 114 or other flash based storage medium, transferring the information by printing the information using a printer 115, copying information to the clipboard 115a of the local operating system, etc. In such an event, all the information that is transmitted through the computer 111 needs to be monitored to ensure that secure or sensitive information does not get transferred.

To achieve this purpose, the various egress points of the computer 111 are monitored to detect any activity that purports to disclose information through the egress points. A software agent, called the protect agent 109, is run on the computer 111 to monitor activity at the egress points (112, 113, 114, 115, 115a) associated with the computer 111. If the organization supports more than one computer system, each of these computer systems (110, 116, 117) have protect agents installed on them to ensure that the activity on each of the computer systems is monitored. In one embodiment, the protect agent 109 is a set of computer instructions or a computer implemented program available on a memory location (e.g., on a magnetic tape drive, a flash memory drive, etc.) at the site of the protect agent 109.

In addition to being installed in every computer system (110, 116, 117) in the network, the protect agents are also installed on other vulnerable egress points across the organization. One example of such a vulnerable egress point includes one or more email server systems 124 connected to the network. The email server 119 handles and routes the emails sent out and received by the organization. The protect agent 120 installed on the email server 119 monitors the emails desired to be sent out of the organization through the email server. Another example of a vulnerable egress point could be a print server 121 connected to the organization's network. A protect agent 123 connected to the print server 122 monitors print jobs sent by the users to the printers connected to the network.

Additional examples of vulnerable egress points include network appliance systems 126. Here, a protect agent 128 is installed in each network appliance 127 to ensure that information disclosed through a particular network appliance 127 is monitored. Examples of using network appliances 126 to transfer data include sharing of data over a network share medium, data transferred at the socket or TCP layer of the network, etc. It is understood that in addition to these examples, the egress points also include other porous environments through which information can be disclosed by the user beyond the secure environment of the organization.

In one embodiment, a registered fingerprint database 118 is provided locally at the site at which each of the protect agents is installed (e.g., the user's desktop/laptop computer, one of the network appliances, etc.). In one embodiment of implementing a local registered fingerprint database 118, the registered fingerprint database 118 comprises a set of registered fingerprints generated from the secure information that the organization desires to protect. This secure information could include any digital data, including digital text, digital video, digital audio, computer generated design files (e.g., VLSI or CAD design files), files comprising binary or ASCII data, or any other digital information that the organization may desire to protect. The registered fingerprints are fingerprints generated from the organization's secure information, and in this embodiment, the registered fingerprints are stored as-is without any further compression or processing.

In another embodiment of implementing a local registered fingerprint database 118, the registered fingerprint database 118 is a lightweight fingerprint database. The lightweight fingerprint database comprises lightweight fingerprints that are generated by compressing the registered fingerprints. Detailed information on compressing the registered fingerprint database to generate a lightweight fingerprint database is provided further below. At least one redundant copy of the lightweight fingerprint database is stored locally at the site of each protect agent 109 such that the protect agent can access or communicate with the lightweight fingerprint database even when the protect agent is not connected to any network. For example, a protect agent 109 implemented on a user's laptop computer monitors the activity at all egress points of the user's laptop computer (e.g., 112, 113, 114, etc.) and prevents unauthorized disclosure of information from the laptop computer through the egress points, even if the laptop computer is not connected to any network (e.g., the organization's local network, the public internet, etc.).

In one illustrative embodiment, the computer systems and all other systems representing egress points (the egress point systems) are centrally connected to a network 125. In one embodiment, the network includes a local network. This includes a network that is managed and maintained locally by the organization. In another embodiment, the network could also be the internet. In the case of the internet, each of the egress point systems could be directly and individually connected to the internet, or could be connected to a local network or a cluster of local networks, with each of the local networks communicating with each other through the internet. Other combinations of the egress point systems within the local network and the internet are possible and such combinations will be apparent to a person of skill in the art.

In one embodiment where the egress point systems are connected to the network, one or more registered fingerprint servers (e.g., 131, 132, 133, 134, 135) are available and connected to the network. At least one copy of the database of registered fingerprints is stored at each of the registered fingerprint servers. In one example, each of the registered fingerprint servers (131, 132, 133, 134, 135) is connected directly to the network. In another example, each of the registered fingerprint servers (131, 132, 133, 134, 135) is connected to a fingerprint server router 130.

Examples of the functions of the fingerprint server router 130 include routing requests from a protect agent 109 to the least busy registered fingerprint server, collecting performance statistics of the registered fingerprint servers (131, 132, 133, 134, 135) to determine the load on each registered fingerprint server (such that a request from a protect agent can be routed to the least busy registered fingerprint server, synchronizing and version control of the redundant copies of the database of registered fingerprints at each registered fingerprint server, etc.

In one embodiment, the registered fingerprint servers (131, 132, 133, 134, 135) could be located at different geographical locations (not shown in FIG. 1) and connect to the fingerprint server router 130 through the network. This distributed model would allow organizations to run protect agents with minimal performance lag across geographically diverse locations, such that information from the protect agents are routed to the most optimal fingerprint server. It should be noted that the registered fingerprint server router is not imperative to maintaining a distributed registered fingerprint server array. Any other means known in the art through which a distributed network can be achieved can be employed in the place of the fingerprint server router 130.

In the case of the public internet, the registered fingerprint servers function as hosted registered fingerprint servers. A hosted registered fingerprint server is similar to the registered fingerprint server connected to a local network in that it contains at least one copy of the database of registered fingerprints. However, the difference is that the hosted registered fingerprint server is publicly accessible over the internet.

One advantage of using a hosted fingerprint server is that an organization does not have to deploy and manage one or more server appliances within its networks. Some small organizations may not even have infrastructure to maintain a network and host a fingerprint server, but may still require their secure information to be protected. In such cases, the support and manageability of the fingerprint server can be done by even a third party provider who provides the service of a hosted fingerprint server.

A provider offering a hosted registered fingerprint service can also support multi-tenancy services, whereby the provider shares the hosted registered fingerprint server's resources across different organizations and cutting down on costs. In one embodiment, this would allow registered fingerprint databases for multiple organizations to reside on the same server.

It is emphasized that the network 125 and fingerprint servers 140 depicted in FIG. 1 are for illustrative purposes specific to one embodiment. It is understood that a network 125 or a fingerprint server setup 140 is not essential to fingerprint lookups using locally stored lightweight fingerprint databases. Examples of embodiments utilizing the utilizing the network 125 or functioning without the network 125 will be apparent from the discussion of FIGS. 2-4 below.

Detailed information on how the lightweight fingerprint databases are generated, how they are kept up-to-date by communicating with the registered fingerprint servers, how a combination of the lightweight fingerprint databases and the registered fingerprint server can be used by the protect agents, etc. are provided in reference to FIGS. 2-4 below.

Figure 2:
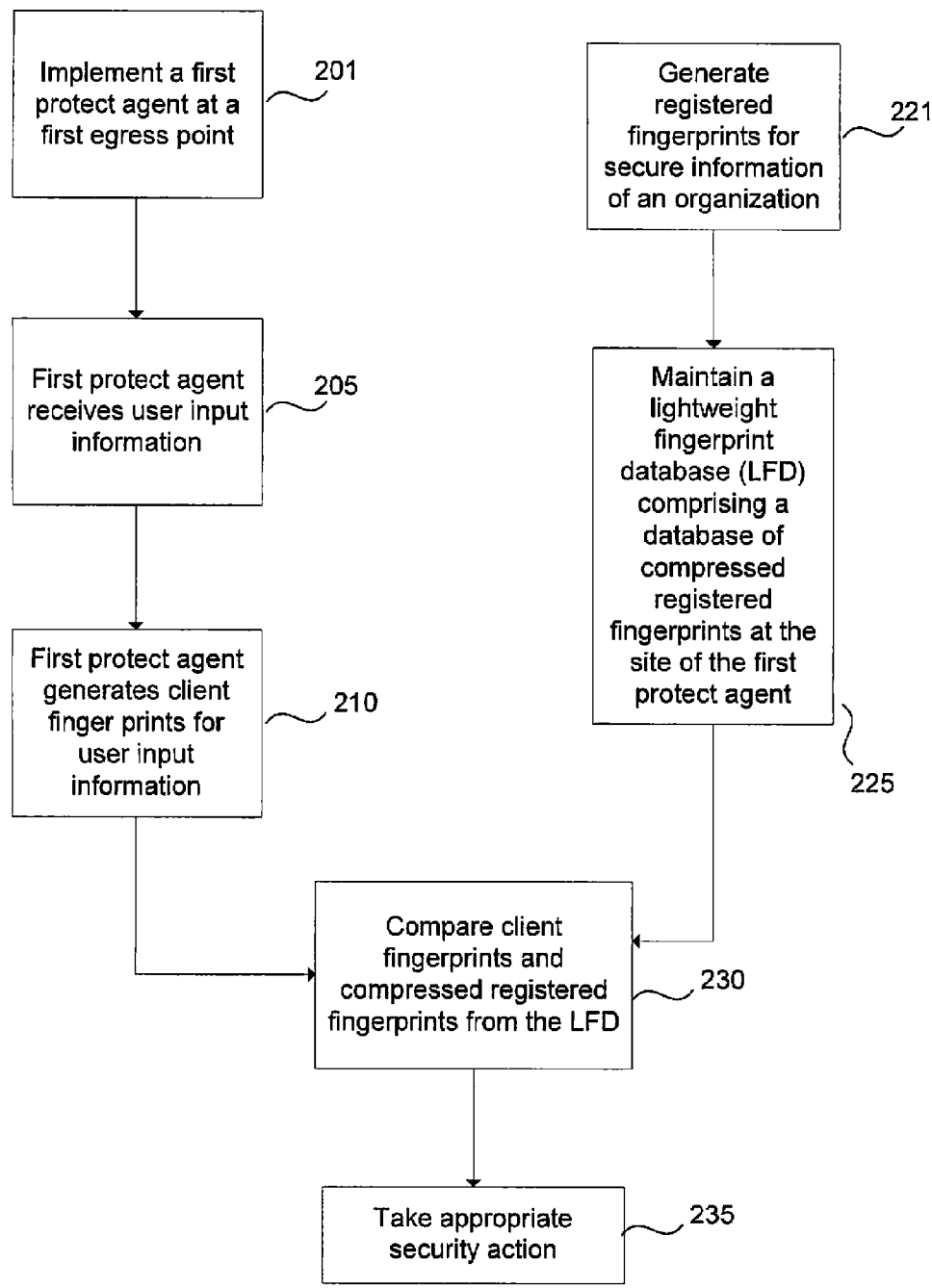
FIG. 2 is a flowchart depicting one embodiment of a method to achieve fingerprint lookups using a lightweight fingerprint database.

FIG. 2 is a flowchart depicting one embodiment of a method for implementing fingerprint lookups using a lightweight fingerprint database (LFD). In this method, a protect agent is first installed 201 at the location of the various egress points. As discussed above, some examples of where the protect agent could be installed include a desktop computer, a print server, an email server, etc. In one embodiment, the protect agent is a set of instructions or software modules copied to a physical memory on the egress point location. Examples of the physical memory include magnetic tapes, optical disks, flash memory devices, etc. Once the protect agent is installed at a particular egress point location, it monitors all the activity at that particular egress point. For example, a protect agent installed on a desktop computer would monitor all print jobs sent by the user to a printer directly attached to the desktop computer.

In the course of monitoring the activity at egress points, the protect agent receives the information 205 that the user intends to disclose through one of the egress points. The information received by the protect agent is mostly in the form of a digital file. Examples of such digital files or information include text files, audio files, video files, etc. Examples of the digital information also include all other forms of digital data that comprise information considered sensitive to an organization, and includes examples such as software code, design data (e.g., VLSI designs, CAD designs, etc.), etc.

In one embodiment, the protect agent that received the digital input information processes the information to generate client fingerprints 210. These client fingerprints represent the digital input information. In one embodiment, the client fingerprints are stored in physical memory at the site of the first protect agent. In another embodiment, the client fingerprints are maintained in cache memory at the site of the protect agent and used for subsequent transmission or comparison analysis. There are several means and methods known to people in the art by which representative fingerprints can be generated from digital data. For example, one such method is provided in the U.S. patent application Ser. No. 12/177,043, describing how fingerprints are generated using wordruns from digital text files.

In one embodiment, a set of registered fingerprints is generated for the secure information that the organization desires to protect 221. Again, the registered fingerprints can be generated using fingerprinting methods widely known to people in the art. One example of generating fingerprints from digital text information is provided in the U.S. patent application Ser. No. 12/177,043. The registered fingerprints are the fingerprints generated using one of the fingerprinting methods, and these registered fingerprints generally include associated metadata information. Such metadata information is valuable for auditing and self-remediation purposes (e.g., identifying the source document associated with the fingerprint, categorizing the fingerprints, associating the fingerprint with a particular risk level, etc.).

In one embodiment, the database comprising the registered fingerprints is compressed to generate a lightweight fingerprint database ("LFD"). This LFD is stored locally at the site of each protect agent such that the protect agent can communicate with the LFD directly and without any need for a network. The registered fingerprints can be compressed using one of several ways.

In one embodiment, the registered fingerprints are stripped off any associated metadata information in order to reduce the physical storage size of the registered fingerprints. In another embodiment, the registered fingerprints are compressed by storing them in a data structure that supports membership query while introducing a small probability of false positives in the membership query.

An example of such a data structure is a Bloom filter, where a large bit vector and multiple hash functions are used to determine whether a client fingerprint being inspected may potentially be present in the lightweight fingerprint database. The Bloom filter is implemented using a sequence of software instructions as indicated by an algorithm, and such software is physically stored at a physical memory location at the site of the protect agent. The implementation of the Bloom filter itself is widely known in the art and people of skill in the art should be able to reproduce the functions of a Bloom filter to generate the LFD as indicated in this embodiment.

At 230, the protect agent compares the client fingerprints against the lightweight fingerprints comprised in the LFD. If the comparison analysis indicates that at least one of the client fingerprint might match with the lightweight fingerprints in the LFD, an appropriate security action is initiated 235. It is noted that where approximate member query methods (e.g., the Bloom filter method) is used, there is a low chance, if at all, of false positives being reported (e.g., the protect agent may report that a client fingerprint matches with a lightweight fingerprint in the LFD even if that particular client fingerprint is not present in the LFD). However, by virtue of the nature of the Bloom filter implementation, false negatives (e.g., not reporting that a particular client fingerprint matches against the LFD even though the particular client fingerprint is present in the LFD) are never reported. This nature of the Bloom filter having a low change of reporting false positives, if at all, but not false negatives makes it particularly useful in the implementation of the LFD.

As indicated in 235, a suitable security action is initiated in response to the client fingerprint possibly matching against a lightweight fingerprint in the LFD. Examples of such security actions include preventing the information from being transmitted out through the associated egress point, sending out a security alert to a system administrator, revoking the user's access to the particular information, alerting the user of the security violation, etc. The security actions may also include integration with third party software to offer security solutions (e.g., integration with Microsoft Windows® RMS to apply rights management to the information being disclosed). It is understood that these examples of security actions are used for illustrative purposes only, and that other security actions known to people skilled in the art are equally applicable here.

Figure 3:
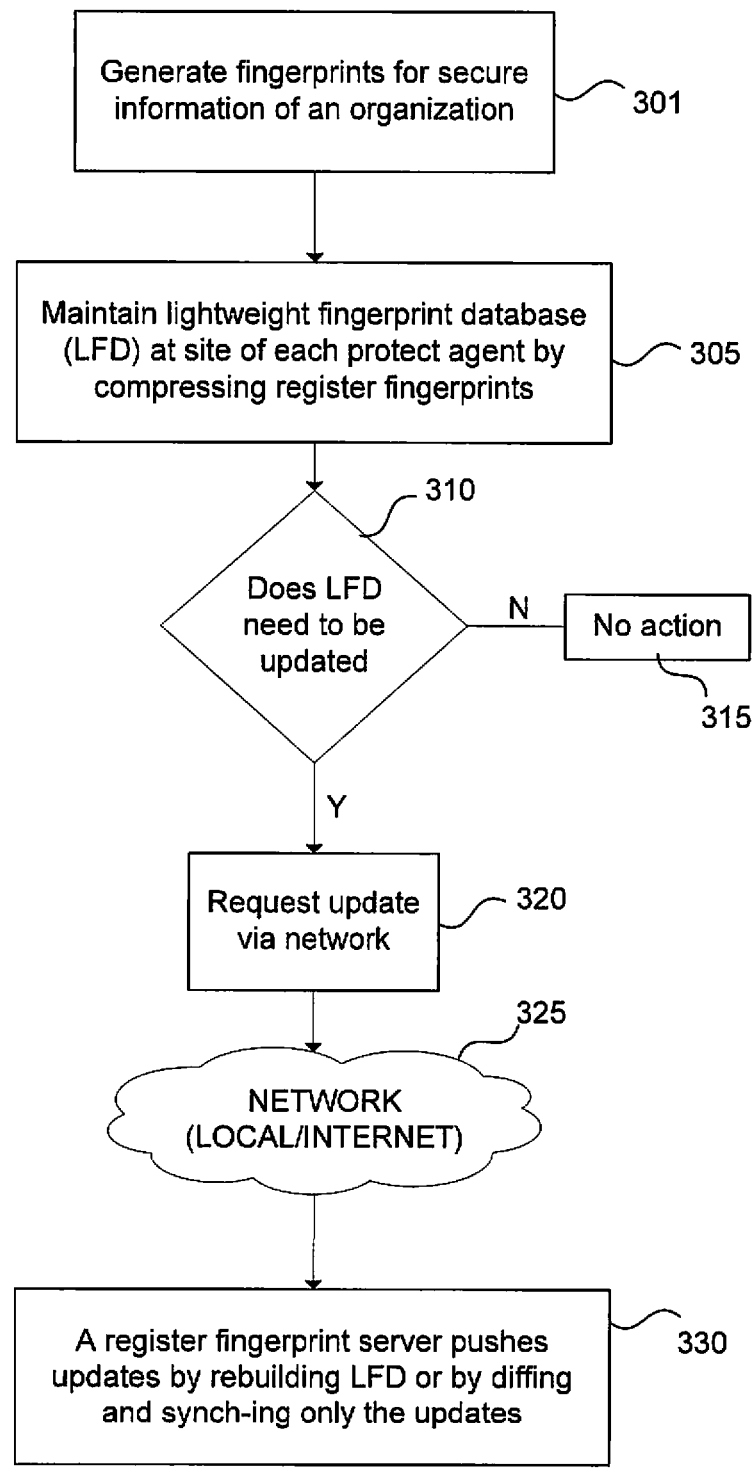
FIG. 3 is a flowchart illustrating a method to update and synchronize the lightweight fingerprint databases stored locally across all protect agents.

FIG. 3 is a flowchart representing a method for ensuring that the LFD is efficiently distributed across all the protect agents and that the LFD at a particular protect agent is kept up-to-date and in synch with the LFDs at other protect agents. In one embodiment, the method uses one or more registered fingerprint servers to achieve this. Here, registered fingerprints are generated for the secure information that the organization desires to protect 301. These registered fingerprints, as discussed above, are stored in LFDs at the site of each protect agent 305 after being compressed (as discussed above). The registered fingerprints are also stored in a registered fingerprint database at a registered fingerprint server, which can be accessed by the protect agent utilizing a network. The latest version of an LFD can also be maintained at the registered fingerprint server; such that this latest version LFD can be used to feed updates to the client LFDs stored locally at various protect agents.

The client LFD or the protect agent associated with the client LFD does not normally need to communicate with the registered fingerprint server 315. However, when there is a need to distribute the LFD to the site of a particular protect agent, or when a particular client LFD has to be updated 310, the protect agent communicates with the registered fingerprint server utilizing the network 320. The network 325, as discussed above, could either be a local network specific to the organization, or could be the public internet such that the registered fingerprint server behaves as a hosted service. The registered fingerprint server then communicates with the client LFD at the particular protect agent either to distribute the LFD contents or to update the contents of the LFD to keep it up-to-date 330. While using the registered fingerprint server does not eliminate the overall need for some kind of fingerprint server or a hosted service in this embodiment, the overall traffic and resources required to maintain these servers are greatly reduced.

In one embodiment, an LFD update can be done by completely rewriting or rebuilding the client LFD at a particular protect agent when an update or synchronization with the LFD at the registered fingerprint server is required. In another embodiment, a diff approach is employed to keep the LFDs update or in synch. In the diff approach, the client LFD at a particular protect agent communicates with the registered fingerprint server to report its current version. In response to that information, the registered fingerprint server communicates and provides to the client LFD only deletion, modification, or addition operations required to bring the particular client LFD up-to-date with the LFD at the registered fingerprint server.

In an embodiment that uses a Bloom filter for compression of the database, only information on what bits are to be flipped on or off needs to be transmitted. The diff approach conserves resources and reduces load and latency on the registered fingerprint servers, especially when the registered fingerprint servers manage thousands of protect agents containing LFDs.

Figure 4:
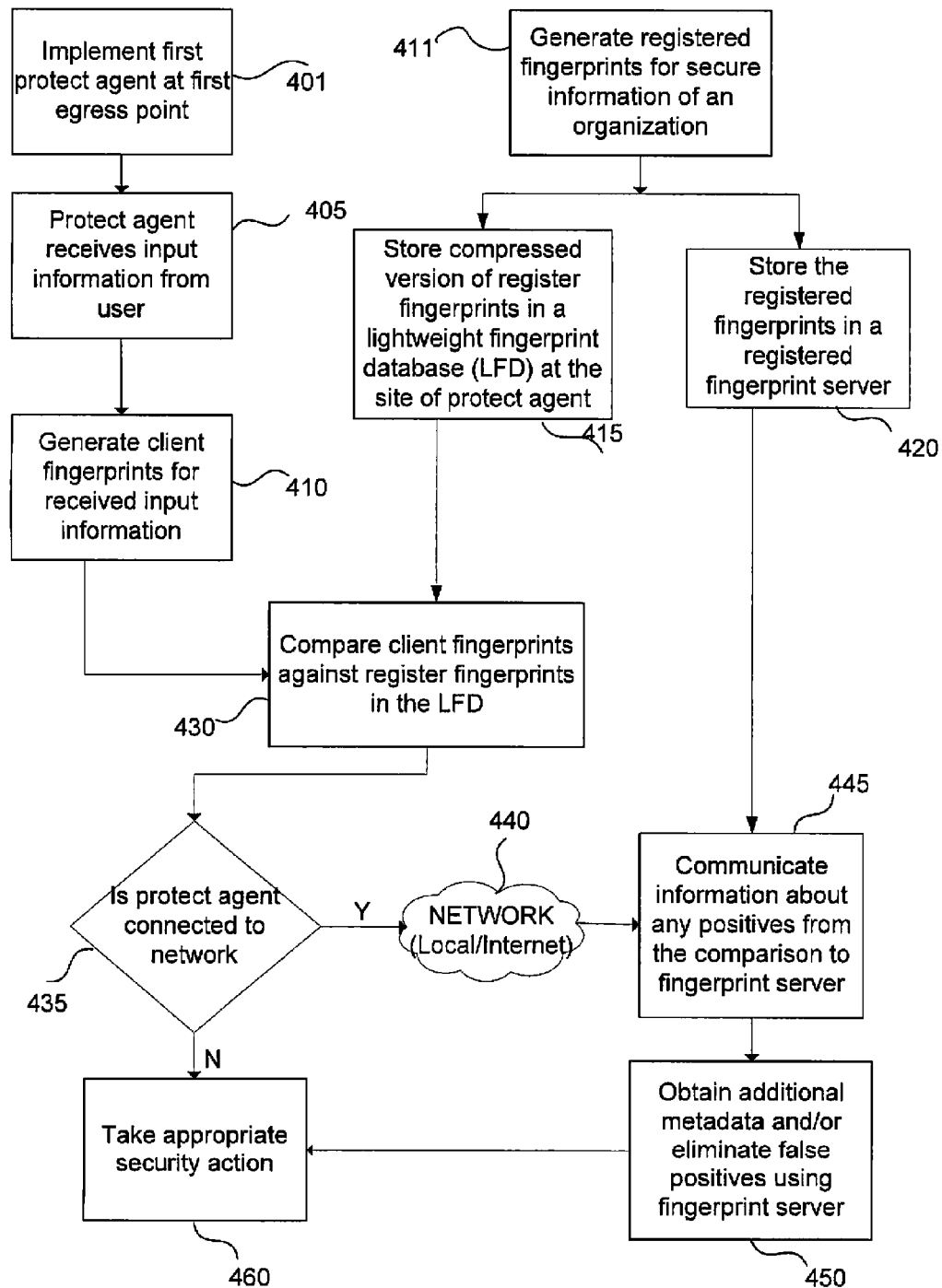
FIG. 4 is a flowchart depicting an embodiment of a combined fingerprint lookup method, where a combination of lightweight fingerprint databases and remote fingerprint servers are used.

FIG. 4 illustrates a method to combine local lookup and remote fingerprint server techniques to protect an organization's secure information. In one embodiment, protect agents are implemented at various egress points within the organization 401. The protect agent receives the digital input information that a user desires to disclose outside of the organization 405. The protect agent also generates client fingerprints from the digital input information it receives from the user 410. In one embodiment of this implementation, registered fingerprints are generated for the secure information that the organization desires to protect 411. These registered fingerprints are stored in registered fingerprint servers 420. These registered fingerprint servers communicate when necessary with the protect agents utilizing the network. Additionally, a compressed version of the registered fingerprints are stored in an LFD, and redundant copies of the LFD are stored locally at the site of every protect agent 415.

In one embodiment of the combined approach, the protect agent first compares the client fingerprints against the locally stored client LFD 430. This allows the protect agents to perform full fingerprint lookups locally even when the protect agent is not connected to the network (e.g., when a user is using laptop outside of the office environment and is totally disconnected from the network). However, the local lookup through the client LFD is done at the expense of either having false positives (e.g., when using an approximate member query methods such as Bloom filters to compress the database) and/or losing richer metadata information associated with the fingerprints. As indicated, in one embodiment, if the protect agent is completely disconnected from the network 435 at the time he desires to transmit data through an egress point, i.e., if the step of 430 detects any positives (or matches) when comparing the client fingerprints against the client LFD, an appropriate security action 460 is initiated.

However, after determining that there are positives resulting from the comparison of the client fingerprints and the client LFD, if the protect agent is determined to be connected to the network 435, then a different sequence of steps are carried out. In this embodiment, the protect agent communicates information about the positives to the registered fingerprint server 445 utilizing the network 440. As discussed above, the network 440 could either be a local network or the public internet, or a combination of the two. In this embodiment, the registered fingerprint server receives information only about the positives resulting from step 430, and does not have to do lookups on every client fingerprint associated with the input information that the user desires to disclose.

As a result, the number of requests to the registered fingerprint server using the network is considerably reduced, resulting in a number of advantages. Examples of these advantages include freeing up the network, reducing lookup latency due to communication through the network for every client fingerprint lookup, freeing up the fingerprint server resources, etc. When the registered fingerprint server receives information about the positives from the protect agent, it responds with additional or overhead information corresponding only to the positives 450. Examples of the additional or overhead information could include providing the richer metadata information associated with the fingerprints corresponding to the positives. This metadata information can be valuable for auditing or self remediation purposes (e.g., source document information, category assignment, risk level information, etc.). In the case of the Bloom filter implementation, the additional or overhead information could also include eliminating false positives, thus acting as a verification stage and improving the efficiency of the lookup analysis.

The combined approach is useful when the protect agent is connected to the network. However, as indicated above, when the protect agent is disconnected from the network, the protect agent can fallback to performing lookups using the client LFDs.

Additionally, in another embodiment, a slightly different approach can be employed in the combined context. In this embodiment, when the protect agent is disconnected from the network, the protect agent compares the client fingerprint against the lightweight fingerprints contained in the client LFD. However, when the protect agent is connected to the network, it communicates with the registered fingerprint server utilizing the network to compare the client fingerprints against the registered fingerprints. Either of these combined approaches would ensure that the organization's secure information is protected regardless of whether the protect agent governing the user's input information is connected to the network or not.

The systems corresponding to the methods explained above and associated embodiments relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system.

The algorithms and software presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from other portions of this description. In addition, the present invention is not described with reference to any particular programming language, and various embodiments may thus be implemented using a variety of programming languages.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A computer implemented method for protecting an organization's secure information from unauthorized disclosure, the computer implemented method comprising:
    implementing a first protect agent at a first egress point, wherein the first protect agent receives input information for transmission outside of the organization, and wherein the input information is transmitted outside of the organization through the first egress point;
    comparing a first set of client fingerprints associated with the input information received by the first protect agent against a lightweight fingerprint database, wherein registered fingerprints are generated from the organization's secure information, each fingerprint of the registered fingerprints and of the first set of client fingerprints representing a specific piece of secure data, and further wherein the lightweight fingerprint database stores lightweight fingerprints generated from registered fingerprints using a fingerprint compression;
    maintaining the registered fingerprints in a registered fingerprint server;
    upon detecting one or more positives during the comparison, and the first protect agent is able to communicate with the registered fingerprint server, transmitting information about the positives to the registered fingerprint server, and in response the registered fingerprint server provides to the first protect agent overhead information corresponding to the positives, wherein the overhead information includes information for eliminating false positives detected during the comparison; and
    upon detecting one or more positives during the comparison, and the first protect agent is unable to communicate with the registered fingerprint server, performing a security action by the first protect agent, wherein performance of the security action safeguards the organization against unauthorized disclosure of the input information.

2. A computer implemented method for protecting an organization's secure information from unauthorized disclosure as recited in claim 1, wherein the database of registered fingerprints is located locally at the site of the first protect agent.

3. A computer implemented method for protecting an organization's secure information from unauthorized disclosure as recited in claim 1, wherein the fingerprint compression includes generating raw fingerprints by removing metadata associated with the registered fingerprints.

4. A computer implemented method for protecting an organization's secure information from unauthorized disclosure as recited in claim 3, wherein the fingerprint compression includes storing the registered fingerprints in a probabilistic data structure.

5. A computer implemented method for protecting an organization's secure information from unauthorized disclosure as recited in claim 4, wherein the probabilistic data structure is a Bloom filter.

6. A computer implemented method for protecting an organization's secure information from unauthorized disclosure as recited in claim 1, the computer implemented method further comprising:
    updating the lightweight fingerprint database using updates from the registered fingerprint server.

7. A computer implemented method for protecting an organization's secure information from unauthorized disclosure as recited in claim 6, wherein the lightweight fingerprint database receives updates from the registered fingerprint server utilizing a network.

8. A computer implemented method for protecting an organization's secure information from unauthorized disclosure as recited in claim 7, wherein the network includes a local network.

9. A computer implemented method for protecting an organization's secure information from unauthorized disclosure as recited in claim 7, wherein the network includes public internet.

10. A computer implemented method for protecting an organization's secure information from unauthorized disclosure as recited in claim 7, wherein the network includes a combination of the local network and the public internet.

11. A computer implemented method for protecting an organization's secure information from unauthorized disclosure as recited in claim 7, the computer implemented method further comprising:
    using a diff approach to update the lightweight fingerprint database, whereby the first protect agent communicates a current version of an associated lightweight fingerprint database to the registered fingerprint server, and the registered fingerprint server responds with a relational information to update the lightweight fingerprint database.

12. A computer implemented method for protecting an organization's secure information from unauthorized disclosure as recited in claim 1, wherein the first protect agent communicates with the registered fingerprint server utilizing a network.

13. A computer implemented method for protecting an organization's secure information from unauthorized disclosure as recited in claim 12, wherein the network includes at least one of a local network or public internet, such that:
    the first protect agent communicates with the registered fingerprint server utilizing the local network when the first protect agent is connected to the local network; and otherwise, the first protect agent communicates with the registered fingerprint server that operates as a hosted service provider, when the first protect agent is disconnected from the local network.

14. A computer implemented method for protecting an organization's secure information from unauthorized disclosure as recited in claim 1, wherein the overhead information includes metadata associated with the fingerprint comparison positives.

15. A computer implemented method for protecting an organization's secure information from unauthorized disclosure, the computer implemented method comprising:
  implementing a first protect agent at a first egress point, wherein the first protect agent receives input information for transmission outside of the organization, and wherein the input information is transmitted outside of the organization through the first egress point;
  generating a first set of client fingerprints representing the input information;
  maintaining a lightweight fingerprint database locally at the site of the first protect agent, wherein registered fingerprints are generated from the organization's secure information, wherein the lightweight fingerprint database includes lightweight fingerprints generated from registered fingerprints using a fingerprint compression;
  comparing the first set of client fingerprints against the lightweight fingerprint database of registered fingerprints; and
  maintaining the registered fingerprints in a registered fingerprint server;
  upon detecting one or more positives during the comparison, and the first protect agent is able to communicate with the registered fingerprint server, transmitting information about the positives to the registered fingerprint server, and in response the registered fingerprint server provides to the first protect agent overhead information corresponding to the positives, wherein the overhead information includes information for eliminating false positives detected during the comparison; and
  upon detecting one or more positives during the comparison, and the first protect agent is unable to communicate with the registered fingerprint server, performing a security action by the first protect agent, wherein performance of the security action safeguards the organization against unauthorized disclosure of the input information.

16. A computer implemented method for protecting an organization's secure information from unauthorized disclosure as recited in claim 15, wherein the egress point is selected from the group consisting of:
  a printer;
  a removable data storage medium;
  a clipboard associated with a local operating system;
  an email server connected to the network;
  a print server connected to the network; and
  a network appliance connected to the network.

17. A computer implemented method for protecting an organization's secure information from unauthorized disclosure as recited in claim 15, wherein the security action includes at least one of:
  preventing the input information from being disclosed;
  logging the event as a security violation;
  requiring a password from the user to allow the input information to be disclosed;
  blocking the user's access to the input information;
  sending out a security alert; or
  integration of the input information with rights management information.

18. A computer implemented system for protecting an organization's secure information from unauthorized disclosure, the computer implemented system comprising:
  a first protect agent at a first egress point, wherein the first protect agent receives input information for transmission outside of the organization, and wherein the input information is transmitted outside of the organization through the first egress point, and further wherein the first protect agent compares a first set of client fingerprints associated with the input information against a lightweight fingerprint database of registered fingerprints, wherein the registered fingerprints are generated from the organization's secure information, each fingerprint of the registered fingerprints and of the first set of client fingerprints representing a specific piece of secure data, and further wherein the lightweight fingerprint database stores lightweight fingerprints generated from registered fingerprints using a fingerprint compression; and
  a registered fingerprint server containing the registered fingerprints,
  wherein upon the first protect agent detecting one or more positives during the comparison and the first protect agent is able to communicate with the registered fingerprint server, the first protect agent transmits information about the positives to the registered fingerprint server, and in response the registered fingerprint server provides to the first protect agent overhead information corresponding to the positives, wherein the overhead information includes information for eliminating false positives detected during the comparison; and
  upon the first protect agent detecting one or more positives during the comparison, and the first protect agent is unable to communicate with the registered fingerprint server, performing a security action by the first protect agent, wherein performance of the security action safeguards the organization against unauthorized disclosure of the input information.

19. A computer implemented system for protecting an organization's secure information from unauthorized disclosure as recited in claim 18, wherein the lightweight fingerprint database of registered fingerprints is located locally at the site of the first protect agent.

20. A computer implemented system for protecting an organization's secure information from unauthorized disclosure as recited in claim 18, wherein the fingerprint compression includes generating raw fingerprints by removing metadata associated with the registered fingerprints.

21. A computer implemented system for protecting an organization's secure information from unauthorized disclosure as recited in claim 20, wherein the fingerprint compression includes storing the registered fingerprints in a probabilistic data structure.

22. A computer implemented system for protecting an organization's secure information from unauthorized disclosure as recited in claim 21, wherein the probabilistic data structure is a Bloom filter.

23. A computer implemented system for protecting an organization's secure information from unauthorized disclosure as recited in claim 18, wherein the registered fingerprint server further updates the lightweight fingerprint database.

24. A computer implemented system for protecting an organization's secure information from unauthorized disclosure as recited in claim 23, wherein the lightweight fingerprint database receives updates from the registered fingerprint server utilizing a network.

25. A computer implemented system for protecting an organization's secure information from unauthorized disclosure as recited in claim 24, wherein the network includes a local network.

26. A computer implemented system for protecting an organization's secure information from unauthorized disclosure as recited in claim 24, wherein the network includes public internet.

27. A computer implemented system for protecting an organization's secure information from unauthorized disclosure as recited in claim 24, wherein the network includes a combination of the local network and the public internet.

28. A computer implemented system for protecting an organization's secure information from unauthorized disclosure as recited in claim 24, wherein the registered fingerprint server further updates the lightweight fingerprint database using a diff approach, whereby the first protect agent communicates a current version of an associated lightweight fingerprint database to the registered fingerprint server, and the registered fingerprint server responds with a relational information to update the lightweight fingerprint database.

29. A computer implemented system for protecting an organization's secure information from unauthorized disclosure as recited in claim 18, wherein the first protect agent communicates with the registered fingerprint server utilizing a network.

30. A computer implemented system for protecting an organization's secure information from unauthorized disclosure as recited in claim 29, wherein the network includes at least one of a local network or public internet, such that:
the first protect agent communicates with the registered fingerprint server utilizing the local network when the first protect agent is connected to the local network; and
otherwise, the first protect agent communicates with the registered fingerprint server that operates as a hosted service provider, when the first protect agent is disconnected from the local network.

31. A computer implemented system for protecting an organization's secure information from unauthorized disclosure as recited in claim 18, wherein the overhead information includes metadata associated with the fingerprint comparison positives.

32. A computer implemented system for protecting an organization's secure information from unauthorized disclosure, the computer implemented system comprising:
a first protect agent at a first egress point, wherein the first protect agent receives input information for transmission outside of the organization, and wherein the input information is transmitted outside of the organization through the first egress point, and further wherein the first protect agent generates a first set of client fingerprints representing the input information;
a lightweight fingerprint database of registered fingerprints situated locally at the site of the first protect agent, wherein the registered fingerprints are generated from the organization's secure information, wherein the lightweight fingerprint database of registered fingerprints includes lightweight fingerprints generated from registered fingerprints using a fingerprint compression;
means for comparing the first set of client fingerprints against the lightweight fingerprint database of registered fingerprints; and
a registered fingerprint server containing the registered fingerprints,
upon the first protect agent detecting one or more positives during the comparison and the first protect agent is able to communicate with the registered fingerprint server, transmitting information about the positives to the registered fingerprint server, and in response the registered fingerprint server provides to the first protect agent overhead information corresponding to the positives, wherein the overhead information includes information for eliminating false positives detected during the comparison; and
upon the first protect agent detecting one or more positives during the comparison, and the first protect agent is unable to communicate with the registered fingerprint server, performing a security action by the first protect agent, wherein performance of the security action safeguards the organization against unauthorized disclosure of the input information.

33. A computer implemented system for protecting an organization's secure information from unauthorized disclosure as recited in claim 32, wherein the egress point is selected from the group consisting of:
a printer;
a removable data storage medium;
a clipboard associated with a local operating system;
an email server connected to the network;
a print server connected to the network; and
a network appliance connected to the network.

34. A computer implemented system for protecting an organization's secure information from unauthorized disclosure as recited in claim 32, wherein the security action includes at least one of:
preventing the input information from being disclosed;
logging the event as a security violation;
requiring a password from the user to allow the input information to be disclosed;
blocking the user's access to the input information;
sending out a security alert; or
integration of the input information with rights management information.

35. A computer implemented system for protecting an organization's secure information from unauthorized disclosure, the computer implemented system comprising:
a computer implemented first protect agent at a first egress point, wherein the first protect agent receives input information for transmission outside of the organization, and wherein the input information is transmitted outside of the organization through the first egress point;
a lightweight fingerprint database stored in a computer readable medium, wherein-registered fingerprints are generated from the organization's secure information, and further wherein the lightweight fingerprint database stores lightweight fingerprints generated from registered fingerprints using a fingerprint compression;
a computer implemented comparator for comparing a first set of client fingerprints associated with the input information received by the first protect agent against the lightweight fingerprint database, each fingerprint of the registered fingerprints and of the first set of client fingerprints representing a specific piece of secure data; and
a registered fingerprint server containing the registered fingerprints,
wherein upon the comparator detecting one or more positives by the comparison and the first protect agent is able to communicate with the registered fingerprint server, the first protect agent transmits information about the positives to the registered fingerprint server, and in response the registered fingerprint server provides to the first protect agent overhead information corresponding to the positives, wherein the overhead information includes metadata associated with the fingerprint comparison positives; and upon the comparator detecting one or more positives during the comparison, and the first protect agent is unable to communicate with the registered fingerprint server, performing a security action by the first protect agent, wherein performance of the security action safeguards the organization against unauthorized disclosure of the input information.

36. A computer implemented system for protecting an organization's secure information from unauthorized disclosure as recited in claim 35, wherein the lightweight fingerprint database precludes the secure information corresponding to the lightweight fingerprints from being deciphered.

37. A computer implemented method for protecting an organization's secure information from unauthorized disclosure, the computer implemented method comprising:

maintaining the registered fingerprints in a registered fingerprint server, wherein registered fingerprints are generated from the organization's secure information; and implementing a distributed fingerprint service within a network array that includes a plurality of egress points, wherein a protect agent at each of the egress points in the network array performs a fingerprint lookup upon receiving input information for transmission outside of the network array, wherein the input information is transmitted outside of the network array through the egress point, wherein the fingerprint lookup includes the steps of:

comparing a set of client fingerprints associated with the input information against a lightweight fingerprint database, each fingerprint of the registered fingerprints and of the first set of client fingerprints representing a specific piece of secure data, and further wherein the lightweight fingerprint database stores lightweight fingerprints generated from registered fingerprints using a fingerprint compression;

upon the comparator detecting one or more positives during the comparison and the protect agent is able to communicate with the registered fingerprint server, transmitting information about the positives to the registered fingerprint server, and in response the registered fingerprint server provides to the protect agent overhead information corresponding to the positives, wherein the overhead information includes metadata associated with the fingerprint comparison positives; and upon the comparator detecting one or more positives during the comparison, and the protect agent is unable to communicate with the registered fingerprint server, performing a security action by the protect agent, wherein performance of the security action safeguards the organization against unauthorized disclosure of the input information.

38. A computer implemented system for protecting an organization's secure information from unauthorized disclosure, the computer implemented system comprising:

a network array including a plurality of egress points, wherein input information can be transmitted outside of the given organization through each egress point of the plurality of egress points; and a fingerprint lookup component implemented at each egress point of the network array, wherein the fingerprint lookup component includes:

a computer implemented protect agent, wherein the protect agent receives the input information for transmission outside of a given organization;

a lightweight fingerprint database stored in a computer readable medium, wherein registered fingerprints are generated from the organization's secure information, and further wherein the lightweight fingerprint database stores lightweight fingerprints generated from registered fingerprints using a fingerprint compression;

a computer implemented comparator for comparing a first set of client fingerprints associated with the input information received by the first protect agent against the lightweight fingerprint database, each fingerprint of the registered fingerprints and of the first set of client fingerprints representing a specific piece of secure data; and a registered fingerprint server containing the registered fingerprints, wherein upon the comparator detecting one or more positives by the comparison and the protect agent is able to communicate with the registered fingerprint server, the protect agent transmits information about the positives to the registered fingerprint server, and in response the registered fingerprint server provides to the protect agent overhead information corresponding to the positives, wherein the overhead information includes metadata associated with the fingerprint comparison positives; and upon the comparator detecting one or more positives during the comparison, and the protect agent is unable to communicate with the registered fingerprint server, performing a security action by the protect agent, wherein performance of the security action safeguards the organization against unauthorized disclosure of the input information.

* * * * *